Nov. 29, 1966  B. R. WANLASS ETAL  3,288,947
PIVOTABLE AND RECIPROCATING SIX-WAY ROTARY SEAT ADJUSTER
Filed Sept. 29, 1964  3 Sheets-Sheet 2

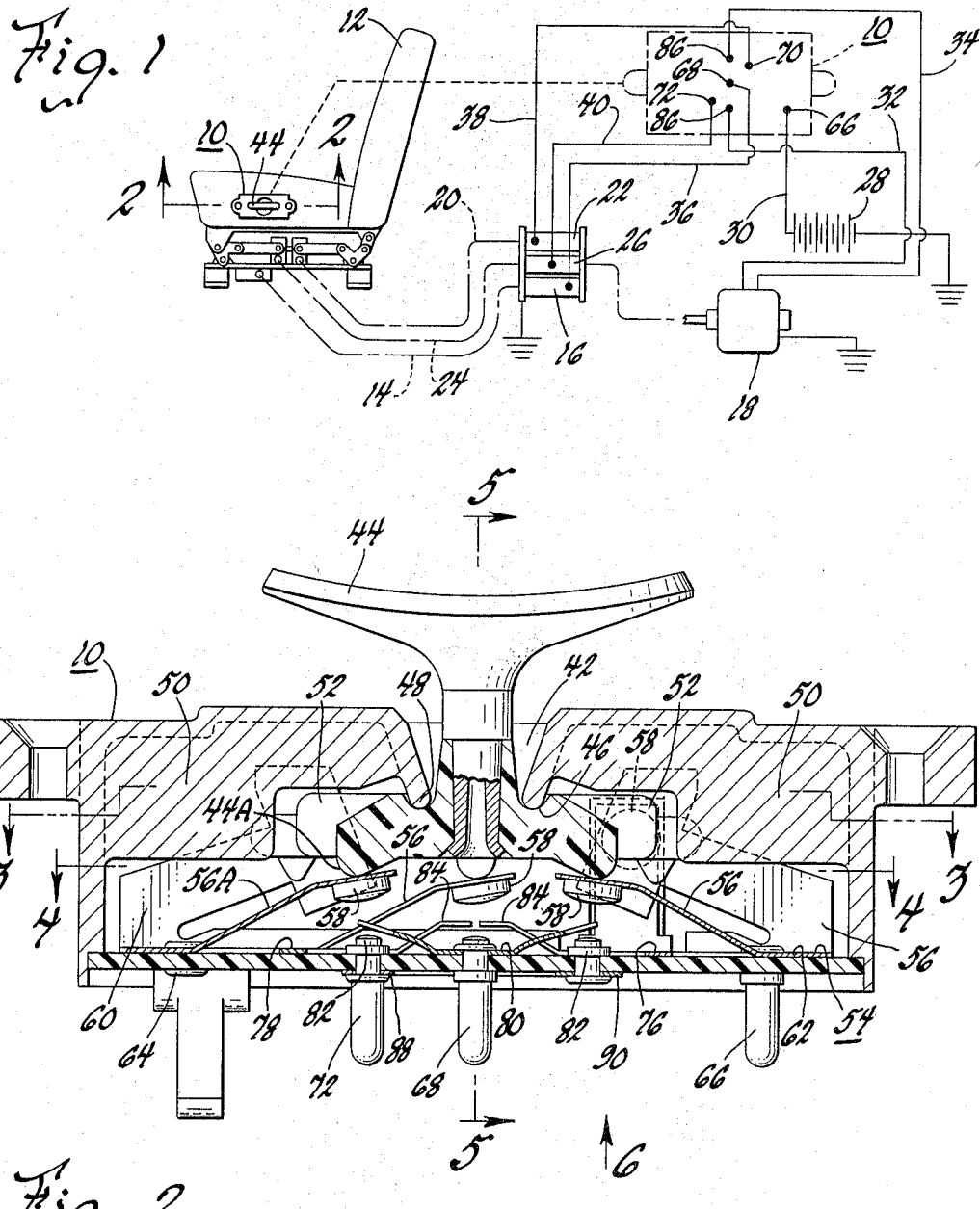

INVENTORS
Bert R. Wanlass
Douglas C. B. Robertson
BY
Donald P. Selvecki
THEIR ATTORNEY Nov. 29, 1966   B. R. WANLASS ETAL   3,288,947
PIVOTABLE AND RECIPROCATING SIX-WAY ROTARY SEAT ADJUSTER
Filed Sept. 29, 1964   3 Sheets-Sheet 3

INVENTORS
Bert R. Wanlass
Douglas C. B. Robertson
BY
Donald P. Selvecki

THEIR ATTORNEY

United States Patent Office 3,288,947
Patented Nov. 29, 1966

3,288,947
PIVOTABLE AND RECIPROCATING SIX-WAY
ROTARY SEAT ADJUSTER
Bert R. Wanlass and Douglas C. B. Robertson, Warren, Mich., assignors to General Motors Corporation, Detroit, Mich., a corporation of Delaware
Filed Sept. 29, 1964, Ser. No. 399,964
7 Claims. (Cl. 200—6)

This invention relates to electric switches and more particularly to an electric switch adaptable for operating a plurality of electrical circuits controlling apparatus utilized in positioning an automobile seat.

It is common in electrical seat adjusters to utilize a multi-actuator electric switch to bring about the selected movements. It is desirable to utilize a single actuator electric switch having an operative movement corresponding to the direction in which it is desired to move the seat. A typically designed automobile seat adjusting mechanism involves three jackscrews mounted beneath a seat that are actuatable through drive cables positioned to a reversible electrical motor by means of electrically powered solenoids. Such systems require that the flexible drive cable be positioned by the solenoid to an electrical motor and, thereafter, electrical motor driven in the appropriate direction to carry out the seat positioning. It is obvious that a sequential electrical circuit energization is therefore required with the added need of the actuator movement in the switch corresponding to the direction which is desired to move the seat.

It is an object of the present invention to provide an improved electric switch adapted for use in an electrical seat adjusting mechanism.

It is another object of the present invention to provide an improved electric switch which is movable in a pivotable manner and axially rotatable form a neutral position, to which position the actuator is automatically returned after an actuating movement.

It is still another object of the present invention to provide an improved electric switch in which a plurality of switching functions is possible and which comprises few parts.

It is a further object of the present invention to provide an electric switch which utilizes low-cost, resilient, conductive materials for contact members in a switch in which the contact members also serve as centering means for the actuator.

Further objects and advantages of the present invention will be apparent from the following description, reference being had to the accompanying drawings wherein a preferred embodiment of the present invention is clearly shown.

In the drawings:

FIGURE 1 is a diagrammatic illustration of a seat positioning system.

FIGURE 2 is a sectional view taken along line 2—2 of FIGURE 1.

Figure 3:
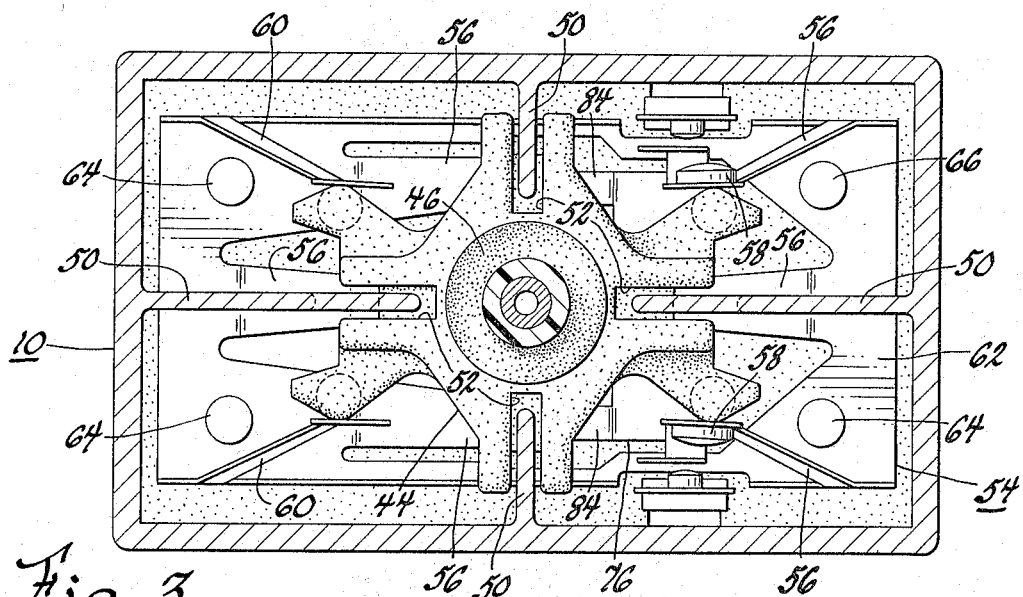
FIGURE 3 is a sectional view taken along line 3—3 of FIGURE 2.

Referring now to FIGURE 1, a seat adjusting switch, generally designated by the numeral 10, is shown mounted in its operative location on the side of a seat 12. A drive cable 14, from a front vertical jackscrew, not shown, mounted beneath the seat, is positioned by a solenoid 16 to a reversible motor 18. A rear vertical jackscrew, not shown, positioned beneath the seat is controlled by a flexible drive cable 20 which is positioned to the motor 18 by a solenoid 22. A drive cable 24, controlling a horizontal jackscrew, not shown, adapted for moving the seat 12 forward and to the rear, is positionable by solenoid 26 to the motor 18.

Power is provided from a battery 28 through a lead 30 to the switch body 10 in a manner to be hereinafter described. An electrical motor 18 is supplied power for operation in one direction through a line 32 to the switch body 10. A lead 34 supplies power to the motor 18 for operation in an opposite direction. The solenoids 16, 22 and 26 are powered through leads 36, 38 and 40, respectively. FIGURE 1 illustrates diagrammatically the electrical connections to the switch body which will be hereinafter more specifically described in detail.

Referring now to FIGURE 2, the switch body 10 has an aperture 42 in which is disposed an actuator lever 44. The actuator lever 44 includes a curved portion 46 adapted to cooperate with a downwardly extending flange 48 formed at the end of the aperture 42. The actuator 44 is movable axially on the flange 48 and is also adapted to be pivoted on the flange 48 in four directions. Formed integrally with the switch body 10 is a series of inwardly projecting flanges 50 arranged to cooperate with slots 52 formed in the actuator 44 to maintain the alignment of the actuator 44 during pivotal movements. The cooperation of the flanges 50 and the slots 52 is more clearly seen in FIGURE 3.

Figure 4:
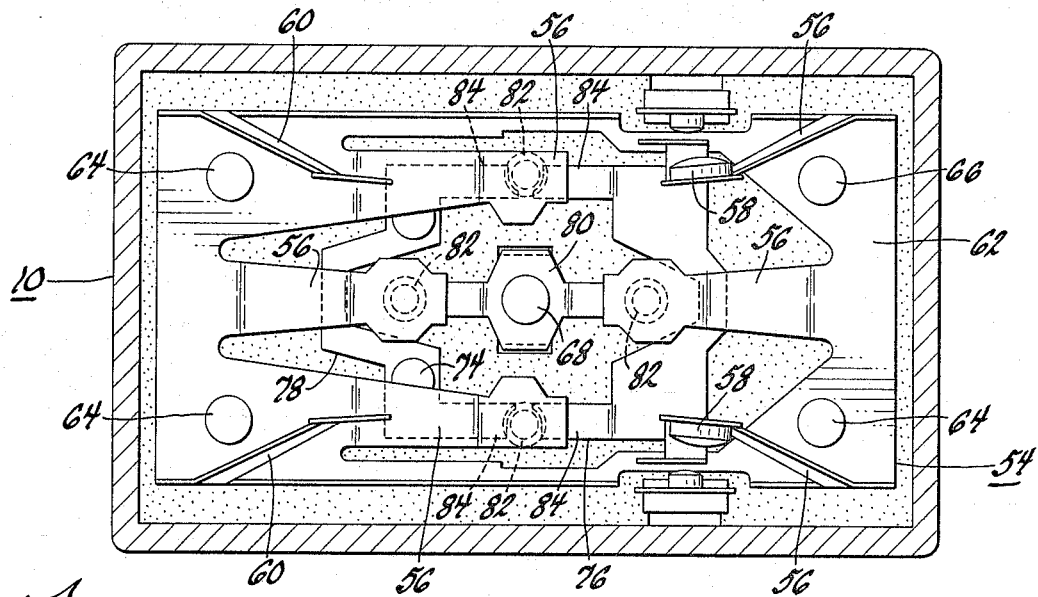
FIGURE 4 is a sectional view taken along line 4—4 of FIGURE 2.

Referring now to FIGURE 4, power is supplied to the switch body through the lead 30 to a contact element 54. Contact element 54 includes a series of integrally formed switch blade members 56, each carrying a contact head 58. A pair of switch blade members 60 are provided without contact heads and serve as centering means for the actuator 44 after axial movement. It is noted that the switch blades 60 cooperate with several of the switch blades 56 to center the actuator after axial movement. The contact element 54 also includes a base portion 62 that is held to one wall of the switch body 10 by rivets 64. A terminal 66 serves to hold the base portion 62 in contact with the switch body 10 in much the same manner as the rivets 64 but has the added function of providing a terminal external to the switch body for electrically engaging the lead 30 from the power source 28. The location of the rivets 64 and the terminal 66 is also clearly illustrated in FIGURE 6.

Figure 6:
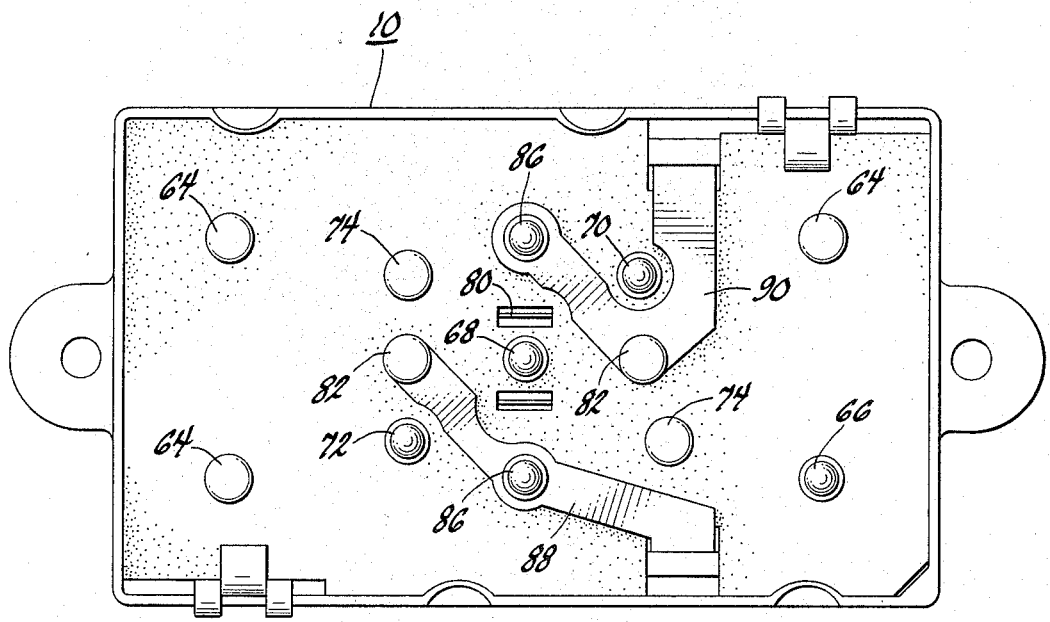
FIGURE 6 is a view taken in the direction of the arrow 6 in FIGURE 2.
Figure 5:
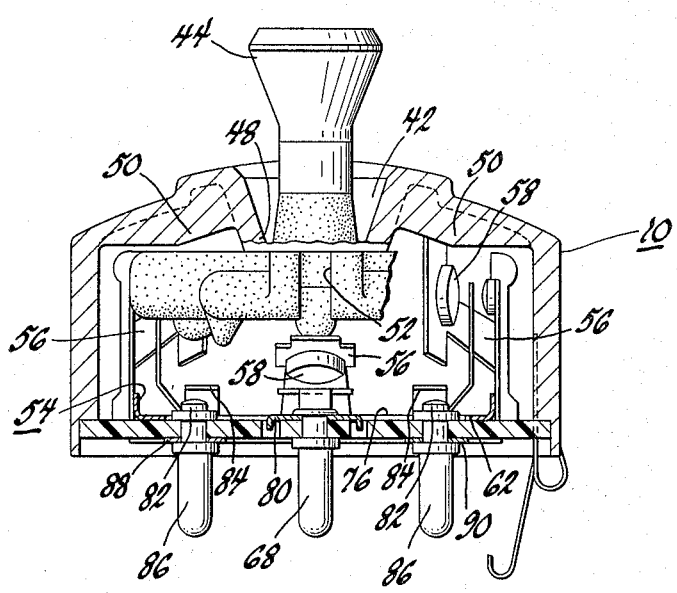
FIGURE 5 is a sectional view taken along line 5—5 of FIGURE 2.

Referring now to FIGURE 6, the leads 36, 38 and 40 engage terminals 68, 70 and 72, respectively. The terminals 68, 70 and 72 are similar to the terminals 66 and cooperate with rivets 74 to secure conductive strips 76, 78 and 80 to the switch body 10. Referring to FIGURE 2, a conductive strip 80 is shown as including upstanding, resilient portions interposed between a contact head 58 and a motor contact head 82. The conductive strips 76 and 78 have upwardly extending leg portions 84, similarly interposed between contact heads 58 carried by the switch blades 56, and motor contacts 82 carried by the switch body 10. Motor terminals 86 have heads disposed within the switch body 10 in much the same manner as the motor contacts 82 but also include terminal portions similar to terminals 66, 68, 70 and 72 which conductively engage the leads 32 and 34 from the reversible motor 18.

Referring now to FIGURE 6, the relative position of the motor contacts 82 in motor terminals 86 is shown, and the contacts 82 and terminals 86 serve to secure conductive strips 88 and 90 to a wall of the switch body 10 in much the same manner as the rivets 64 and terminals 66 secure the base portion 62 to the switch body. It is understood that the conductive contact element 54, the conductive strips 76, 78 and 80 as well as the conductive strips 88 and 90 are carried by the switch body 10 in insulated relationship to each other. It is therefore apparent that a movement of any portion of the switch blades and conductive strips into engagement with each other will provide power to one of the solenoids 16, 22 or 26, and further movement of the switch blades and conductive strips into engagement with any of the permanently mounted motor contacts 82 or terminals 86 will energize the motor 18 to drive one of the selected cables 14, 20 or 24 connected to appropriate jackscrews to position the seat as desired.

In operation, the subject switch is actuated by a vehicle operator when a new seat position is desired. The actuator 44 is pivoted or moved axially in the direction of the desired seat movement. For example, if the actuator 44, as viewed in FIGURE 2, is moved to the left as viewed therein, a forward movement of the seat 12 will result. As previously stated, a typical seat adjusting mechanism in which the subject switch is intended to function involves a solenoid which positions a flexible drive cable to an electric motor, first; and, next the electric motor is energized to be driven in the appropriate direction. In the example given, as the actuator 44 is positioned to the left, the curved portion 46 of the actuator will pivot about the flange 48 and a bead portion 44A will depress a switch blade 56A. A contact head 58 carried by the switch blade 56A will be driven into contact with the conductive strip 80; at which time, the horizontal solenoid 22 will be energized through the lead 38. Further movement of the actuator 44 will drive the conductor strip 80 and the switch blade 56A further until contact is made with the motor contact 82. As this occurs, the electrical motor 18 will be rotated in the appropriate direction and the horizontal jackscrew will drive the seat 12 forward as long as the position induced in the actuator 44 is maintained. The appropriate drive cable will remain positioned to the motor and the appropriate drive cable will continue to operate the jackscrew, thereby moving the seat 12 forward. When the seat 12 has assumed the desired position, pressure is released from the actuator 44 and the inherent resiliency of the switch blade 56A will drive the actuator 44 to a centered position against the flange 48.

It is noted that a movement of the actuator 44 to the right, as viewed in FIGURE 2, will result in an opposite movement of the seat by the positioning of other contact heads and conductive strips in the same manner as that described for the forward movement. Similar movements in the seat in the vertical plane can be brought about by pivoting of the actuator 44 90° from the pivoting previously described. Likewise, an axial movement of the actuator 44 in either direction from a centered position will result in the seat 12 being tilted to the rear or tilted forward. Referring to FIGURE 4, it should be noted that, after movement of the actuator in an axial manner, one of the switch blades 56, assisted by one of the switch blades 60, will cooperate to center the actuator 44.

It is clear then that a movement of the actuator in the direction of desired seat movement will result in an appropriate solenoid positioning of the drive cable and the energizing of the electric motor to drive the previously positioned drive cable. The operation of the contacts, due to the positioning of the switch blade carried contact heads and conductive strips, away results in an initial positioning of the appropriate drive cable to the motor and, later, the energization of the motor to be driven in the appropriate direction.

The switch described herein finds particular utility as a seat positioning switch for use with powered automobile seats. It is understood, however, that the utility of the subject switch can be extended to any application wherein a plurality of sequenced electrical circuits are to be energized. The subject switch has the added advantage of being inexpensive to manufacture and includes very few parts. The unique arrangement of resilient members also acting as contact means results in a switch that is easily moved to an actuated position to sequentially energize circuits and which is automatically centered after the desired circuit function is carried out.

While the embodiment of the present invention, as herein disclosed, constitutes a preferred form, it is to be understood that other forms might be adopted.

What is claimed is as follows:

1. An electric switch for selecting and sequentially energizing a plurality of electrical circuits, said electric switch comprising: a switch body having an opening through one wall thereof; actuator means pivotally supported by portions of the opening in the switch body; means formed on said actuator means coacting with means on said switch body to provide said actuator means with an axial movement capability; first contact means carried in a fixed manner by the switch body and engaging leads to electrical circuits controllable by said electrical switch; second contact means arranged to bias said actuator means toward the opening in the switch body and including portions engaging leads to electrical circuits external to the switch body, said second contact means being deflectable toward said first contact means in response to a pivoting of the actuator means; and third contact means carried by the switch body and including deflectable portions interposed between the first and second contact means and being adapted to be engaged by the second contact means during deflection thereof to energize a first series of electrical circuits and being deflectable by the second contact means into conductive engagement with the first contact means wherein a second series of selected electrical circuits are energized while the first mentioned energized circuits remain energized; said second contact means including resilient portions arranged to center said actuator means after axial movement thereof, said second means adapted to center said actuator means in the opening of the switch body after tilting pivotal movement thereof.

2. An electric switch for selecting and sequentially energizing a plurality of electrical circuits adapted to cooperate to position a seat in response to movement of a portion of the switch in the direction of desired seat movement, said electrical switch comprising: a switch body carried by a seat to be positioned; actuator means pivotally carried by said switch body and includinng a portion extending into the switch body; means formed on said actuator means coacting with means on said switch body to provide said actuator means with an axial movement capability; first contact means carried by a portion of the switch body and conductively engaging leads to the electrical circuits; second contact means engaging the portion of the actuator means disposed in the switch body in a biased manner and electrically engaging one of the electrical circuits; third contact means interposed between said first and second contact means and electrically engaging other electrical circuits, said third contact means being initially energizable by the second contact means in response to movement of the actuator means in a direction of desired seat movement to complete an electrical circuit, said third contact means being deflectable by the second contact means into conductive engagement with said first contact means to energize selected electrical circuits to position the seat in a desired direction.

3. An electric switch according to claim 2 wherein the actuator means includes means for providing axial and pivotal movement on a portion of the switch body, said actuator means being returnable to a poised position by the second contact means.

4. An electric switch according to claim 2 wherein the first contact means includes a conductive head extending into the switch body and terminal portions extending from the switch body engaging leads to external circuits.

5. An electric switch according to claim 2 wherein the second contact means is formed as an integral unit from a resilient conductive material and includes deflectable spring blades engageable by the actuator means in four directions during pivotal movement and during axial movement of the actuator means thereby serving as a centering means for the actuator means.

6. An electric switch according to claim 2 wherein the third contact means is a plurality of conductive elements formed from a resilient conductive material and including deflectable portions interposed between the first and second contact means thereby initially engageable by the second contact means during an actuator movement to energize electrical circuits before the second contact means is driven into conductive engagement with the first contact means.

7. An electric switch for selectively and sequentially energizing a plurality of electrical circuits to apparatus adapted to vary the position of an automobile seat, said electric switch comprising: a switch body carried by the automobile seat and having an opening through one wall thereof, said switch body including a series of flanges projecting from one wall of said switch body; actuator means having portions arranged to cooperate with the opening in the switch body to control axial and pivotal movement of the actuator means, said actuator means having slotted portions adapted to cooperate with the flanges of the switch body during a pivotal movement of the actuator means thereby maintaining the alignment of the actuator means during a pivotal movement thereof; first contact means conductively engaging a portion of the seat positioning apparatus and including portions extending into the switch body; second contact means electrically engaging portions of the seat positioning apparatus and including deflectable spring blades formed integrally therewith and biasedly engaging the actuator means to resist pivotal and axial movement thereof; and third contact means conductively engaging portions of the seat positioning apparatus and including deflectable conductive spring blades interposed between each of the deflectable spring blades of the second contact means and one of the portions of the first contact means extending into the switch body; said actuator means being movable in the direction of a desired seat position to drive one of the deflectable blades of the second contact means into conductive engagement with a deflectable strip of the third contact means thereby completing a path for electrical current flow therethrough to portions of the seat positioning apparatus, said actuator means being further movable to further deflect the second and third contact means deflectable members into conductive engagement with at elast one of the first contact means thereby completing another path for electrical current flow to the seat positioning apparatus to bring about a movement of the seat in a desired direction.

References Cited by the Examiner

UNITED STATES PATENTS 3,040,828    6/1962    Ulinski _____ 200—6 X
3,131,265    4/1964    Toruk _____ 200—6
3,223,791    12/1965   Wanlass _____ 200—6

ROBERT K. SCHAEFER, *Primary Examiner.*

J. R. SCOTT, *Assistant Examiner.*